(12) United States Patent
Storesund

(10) Patent No.: US 10,455,962 B2
(45) Date of Patent: Oct. 29, 2019

(54) DEVICE FOR CRACKING A SHELL OF A FOOD ITEM

(71) Applicant: NOCT AS, Haugesund (NO)

(72) Inventor: Jan Roar Storesund, Vedavågen (NO)

(73) Assignee: NOCT AS, Haugesund (NO)

( * ) Notice: Subject to any disclaimer, the term of this patent is extended or adjusted under 35 U.S.C. 154(b) by 0 days.

(21) Appl. No.: 15/754,110

(22) PCT Filed: Aug. 17, 2016

(86) PCT No.: PCT/NO2016/050171
§ 371 (c)(1),
(2) Date: Feb. 21, 2018

(87) PCT Pub. No.: WO2017/034413
PCT Pub. Date: Mar. 2, 2017

(65) Prior Publication Data
US 2018/0235389 A1 Aug. 23, 2018

(30) Foreign Application Priority Data

Aug. 24, 2015 (NO) .................................... 20151073

(51) Int. Cl.
*A47G 21/06* (2006.01)
*A22C 29/02* (2006.01)
(Continued)

(52) U.S. Cl.
CPC ............ *A47G 21/061* (2013.01); *A22C 29/00* (2013.01); *A22C 29/027* (2013.01); *A47G 21/06* (2013.01); *A47J 43/26* (2013.01)

(58) Field of Classification Search
CPC .... A47G 21/061; A47G 21/06; A22C 29/027; A22C 29/00; A47J 43/26
(Continued)

(56) References Cited

U.S. PATENT DOCUMENTS 2,490,615 A * 12/1949 Bloomfield ............. A47J 43/26
30/120.4
2,986,346 A 5/1961 Rozmus
(Continued)

FOREIGN PATENT DOCUMENTS

CN 203168957 9/2013
FR 980748 5/1951

OTHER PUBLICATIONS

Norwegian Search Report, Norwegian Patent Application No. 20151073, dated Nov. 18, 2015.
(Continued)

*Primary Examiner* — Hwei-Siu C Payer
(74) *Attorney, Agent, or Firm* — Andrus Intellectual Property Law, LLP

(57) ABSTRACT

A device is for cracking a shell of a food item. The device has a first plier, a second plier and a pivot rotatably connecting the first plier with the second plier for enabling the food item, when arranged between the pliers, to be compressed between the pliers by a rotation of the pliers towards each other. The device further comprises a lockable spacing arrangement having an acceleration dependent locking device adapted to permit the rotation of the two pliers towards each other if an acceleration of the rotation is below a threshold value and adapted to lock the rotation of the two pliers towards each other if the acceleration of the rotation is equal to or exceeding said threshold value.

15 Claims, 5 Drawing Sheets

Figure 1:
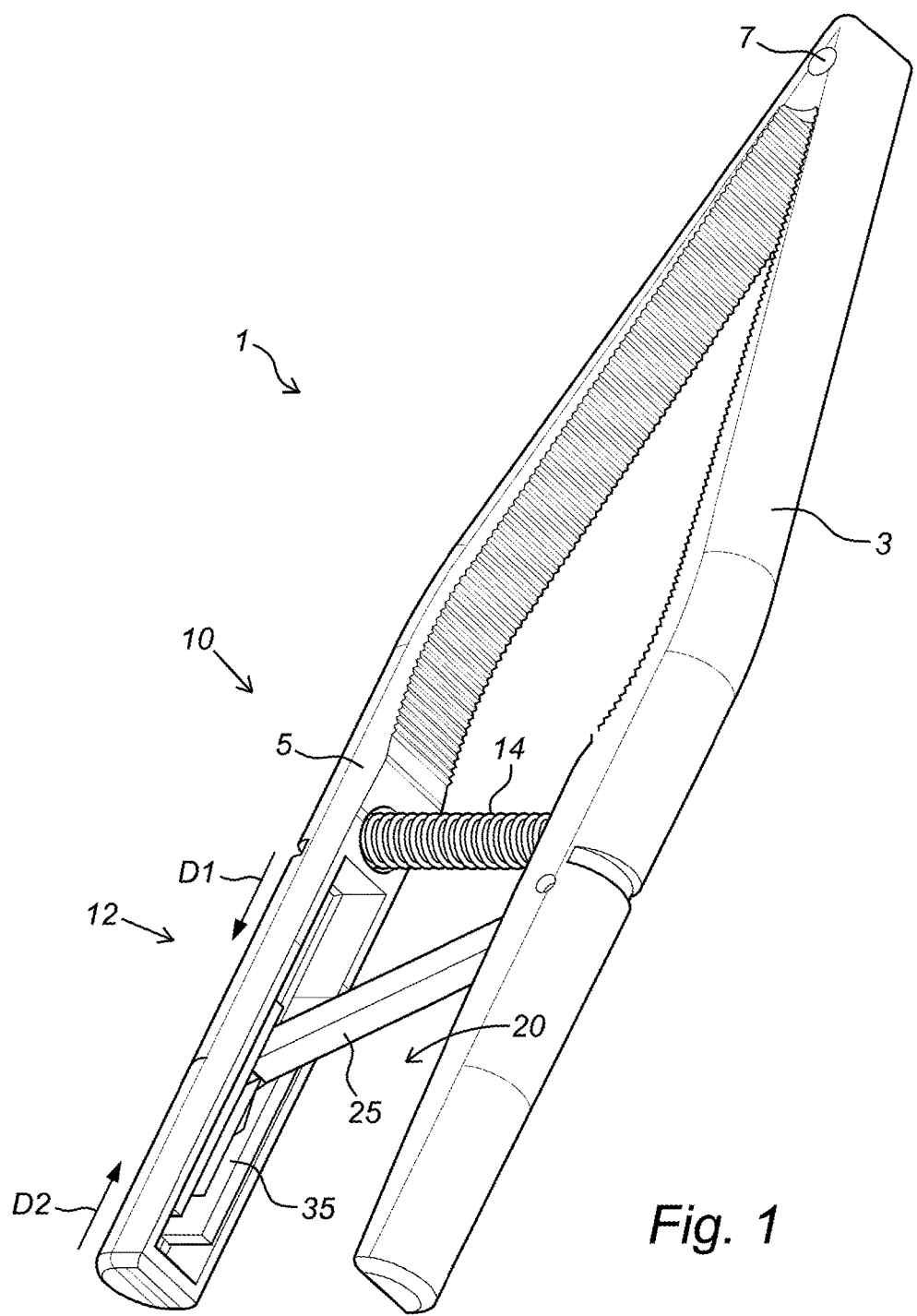

(51) Int. Cl.
*A47J 43/26* (2006.01)
*A22C 29/00* (2006.01)

(58) Field of Classification Search
USPC .............................................. 30/120.1–120.5
See application file for complete search history.

(56) References Cited

U.S. PATENT DOCUMENTS

| | | | | |
|---|---|---|---|---|
| 4,614,034 A | * | 9/1986 | Russell, Jr. | ............. A47J 43/26 30/120.3 |
| 4,905,350 A | | 3/1990 | Gardner | |
| 5,926,957 A | * | 7/1999 | Russell, Jr. | ............... B25B 7/00 30/120.3 |
| 6,151,782 A | * | 11/2000 | Le Bail | ................... A47J 43/26 30/120.1 |
| 2004/0194317 A1 | * | 10/2004 | Pippert | ................... A47J 43/26 30/120.2 |
| 2007/0130775 A1 | * | 6/2007 | Holbrook | ................ A47J 43/26 30/120.4 |
| 2018/0235389 A1 | * | 8/2018 | Storesund | ............ A47G 21/061 |

OTHER PUBLICATIONS

International Search Report, PCT/NO2016/050171, dated Oct. 28, 2016.
Written Opinion and Reply, PCT/NO2016/050171, dated Oct. 26, 2016.
International Preliminary Report on Patentability and Reply, PCT/NO2016/050171, dated Nov. 16, 2017.
Written Opinion, PCT/NO2016/050171, dated Sep. 9, 2017.
Holmes, Text in Applied Mathematics 56, Introduction to the Foundations of Applied Mathematics, Troy, NY, Mar. 2009, ISBN: 978-0-387-87749-5, http://www.springer.com/978-0-387-87749-5.

* cited by examiner

DEVICE FOR CRACKING A SHELL OF A FOOD ITEM

CROSS-REFERENCE TO RELATED APPLICATIONS

This application is the U.S. national stage application of International Application PCT/NO2016/050171, filed Aug. 17, 2016, which international application was published on Mar. 2, 2017, as International Publication WO 2017/034413 in the English language. The International Application claims priority of Norwegian Patent Application No. 20151073, filed Aug. 24, 2015. The international application and Norwegian application are both incorporated herein by reference, in entirety.

INTRODUCTION

The present invention relates to a device for cracking a shell of a food item. In particular, the invention relates to a device for cracking the shell of seafood, such as hummer and crab claws and etcetera. The device comprises a first plier, a second plier and a pivot rotatably connecting the first plier with the second plier for enabling the food item, when arranged between the pliers, to be compressed between the pliers by means of a rotation of the pliers towards each other.

PRIOR ART

Prior art devices for cracking a shell of a food item involve various designs where two connected pliers are rotated towards each other by means of force applied from the hands of the user to the pliers. The pliers act as levers in respect to the food item and enable sufficient compression of the food item in order to crack its shell. The food item is for example, nuts, seafood, and etcetera.

For most use, the traditional "nutcracker" serve its purpose of opening the food item. However, many of us has experienced "a hard nut", i.e. a food item with a shell that is difficult to open and is requiring significant force in order to crack its shell. This is in particular the case when the food item is provided with a strong shell and a soft inner core. The user must then apply a high force in order to crack the shell. However, once the shell has crack, the soft core provides almost no resistance to the compression of the pliers, resulting in that also the core is compressed. Accordingly, the core of such "hard nut" is easily destroyed and thereby the precious edible part is spoiled. Furthermore, certain types of food items, such as crab claws, are as such particular difficult to open in that they are provided with the tedious combination of strong shell and soft crab meat.

In order to crack difficult food item, such as crab claws, specific designed devices are available where the length of the pliers are such that sufficient leverage is provided for cracking the shell using ordinary hand power of the user. While such devices with enlarged pliers enables the shell of the difficult food item to be cracked without efforts, they provide no solution of preventing the core of the food item from being spoiled by the compression of the pliers.

A further problem with prior art devices is that, when encountering such difficult food item, the user may when applying the high force to the pliers by accident pinch a finger when the shell of the food item suddenly cracks and the pliers rapidly move into the core of the food item.

SUMMARY OF INVENTION

The invention has for its object to remedy or to reduce at least one of the drawbacks of the prior art, or at least provide a useful alternative to prior art. A first object of the invention is to provide a device that enables a food item that comprises a combination of strong shell and soft core to be cracked open without spoiling its core by compression. A second object of the invention is to provide a device that mitigates the risk of injuries to the user when opening a food item that comprises a combination of strong shell and soft core.

These objects are achieved through features, which are specified in the description below and in the claims that follow. In particular, these objects are achieved by means of a device according to claim 1. The device is characterized in that the device comprises a lockable spacing arrangement comprising an acceleration dependent locking device adapted to permit the rotation of the two pliers towards each other if an acceleration of the rotation is below a threshold value and adapted to lock the rotation of the two pliers towards each other if the acceleration of the rotation is equal to or exceeding said threshold value.

The soft core of the food item is prevented from being spoiled by the compression of the pliers by means of that the acceleration dependent locking device of the device locks the rotation of the pliers towards each other when the acceleration is equal to or exceeding the threshold value. In case of a difficult food item comprising the combination of a strong shell and a soft core, the user needs to apply a high force for cracking the shell resulting in an acceleration of the pliers that is equal to or above the threshold value when the shell is cracked open. Accordingly, in such case, when the shell is cracked open and the pliers starts accelerate into the core, the acceleration dependent locking device locks the rotation if the acceleration is equal to or exceeding the threshold value. On the other hand, in the case of a food item having less distinct difference in the strength of the shell and the hardness of the core, the user will apply a lower force for cracking the shell resulting in an acceleration of the pliers that is below the threshold value in which the locking device is permitting the continued rotation of the pliers towards each others. In the later case, the acceleration is sufficient low for the user to in due time to stop applying the force without having the pliers spoiling the core by compression and the locking of the pliers is accordingly not necessary.

The invention further prevents injuries to the user when opening difficult food items in that the acceleration dependent locking device locks the pliers when the acceleration of rotation is equal to or exceeding the threshold value. Accordingly, the pliers are in such events immobilized before seriously pinching or crushing fingers of the user.

The term "lock the rotation of the two pliers towards each other" relates to that the pliers are immobilised from further rotation towards each other.

According to an embodiment of the invention, the locking device comprises a disengaged state in which the two pliers are free to rotate towards each other and an engaged state in which the two pliers are prevented from rotating towards each other, wherein the locking device comprising an inertia device biased to a first position relating to the disengaged state and adapted to be displaced from the first position to a second position relating to the engaged state if the acceleration of the rotation of the two pliers towards each other is equal to or exceeding said threshold value.

The inertia device is adapted to sense acceleration of the pliers towards each other. The inertia device is displaceable from the first position to the second position when the acceleration is equal to or exceeding the threshold value. In the first position, the inertia device induces the locking device to be arranged in the disengaged state where the two pliers are free rotatable towards each other. In the second position, the inertia device induces the locking device to be in the engaged state where the two pliers are locked from rotation towards each other. The term "free to rotate towards each other" relates to that the locking device is not preventing the rotation of the two pliers.

The inertia device comprises for example a body in connection to one of the pliers. The body has a mass that requires an acceleration equal to or above the threshold value to overcome a biasing force that enables the body of the inertia device to be displaced from the first position to the second position, thereby locking the rotation of the pliers towards each other. On the other hand, in case of an acceleration below the threshold value, the acceleration is not sufficient to overcome the biasing force to displace the body of the inertia device from the first position to the second position. Accordingly, the body of the inertia device remains in the first position and the pliers are free to rotate towards each other.

According to an embodiment of the invention, the locking device further comprises a first engagement member and a second engagement member arranged at the inertia device and adapted to engage with the first engagement member, thereby locking the rotation of the two pliers towards each other, and a biasing device applying a force on the inertia device, wherein the biasing device is arranged to hold the second engagement member of the inertia device disengaged from the first engagement member if the acceleration of the rotation of the pliers is below said threshold value and arranged to allow the second engagement member of the inertia device to engaged with the first engagement member if the acceleration of the rotation of the pliers is equal to or exceeding said threshold value.

The locking device comprises the inertia device and the biasing device, which biasing device is arranged to act on the inertia device with a force that keeps the inertia device in the first position if the acceleration subjected to the inertia device is below the threshold value. The locking device further comprises the first engagement member and the second engagement member that are adapted to engage with each other in order to provide the locking of the rotation of the two pliers towards each other. The second engagement member is arranged on at the inertia device. The first engagement member is arranged separated from the first engagement member when the inertia device is in the first position. The first engagement member and the second engagement member are in engagement when the inertia device is in the second position. The biasing device is arranged to prevent the inertia device from being displaced from the first position to the second position if the acceleration of rotation of the pliers is below the threshold value and allow the inertia device to be displaced from the first position to the second position if the acceleration of rotation of the pliers is equal to or exceeding the threshold value.

According to an embodiment of the invention, the inertia device comprises a displaceable arm extending between the first plier and the second plier, and where the locking device further comprises a further pivot connecting a first end portion of the arm to the first plier, and an elongated guide member extending along the length of the second plier and connecting a second end portion of the arm displaceable along the length of the second plier, wherein the guide member further comprises the first engagement member and the second end portion of the arm comprises the second engagement member.

The arm is connected to the first plier by means of the further pivot at the first end portion of the arm. The arm is accordingly subjected to the same acceleration as the first plier is subjected to by the user. The arm comprises a body providing inertia when subjected to acceleration. The locking device further comprises the elongated guide member arranged at the second plier. The locking device are configured so that the first engagement member and second engagement member are arranged at separate parts of the locking device. The first engagement member is arranged at the guide member and the second engagement member is arranged at the second end portion of the arm. The locking device enables the rotation of the pliers to be locked by means of that the second engagement member is displaced to engagement with first engagement member.

According to an embodiment of the invention, the guide member comprises two or more first engagement members distributed along the length of the guide member. Each of the two or more first engagement members provides a respective lockable positions for the rotation of the two pliers.

According to an embodiment of the invention, the further pivot at the first plier is arranged closer to the pivot than the guide member at the second plier.

According to an embodiment of the invention, the guide member provides displacement of the second end portion of the arm between a front position and a rear position when the pliers are rotated towards each other, which front position is closer to the pivot than the rear position. The second end portion is displaceable between the front and the rear position at the guide member.

According to an embodiment of the invention, the biasing device is arranged connected between the first plier and the arm so that the arm is pulled with the force away from the guide member.

According to an embodiment of the invention, the biasing device comprises an elastic member connected between the first plier and the arm and adapted to act on the arm with a force that pulls the second engagement member at the second end portion of the arm away from the at least one first engagement members of the guide member while the second end portion of the arm is displaced along the guide member.

According to an embodiment of the invention, the elastic member is a spring, an elastic bar, and etcetera.

According to an embodiment of the invention, the guide member comprises an elongated support member extending along the length of the guide member and the second end portion of the arm comprises a support part adapted to be guided by the support member along the length of the guide member.

According to an embodiment of the invention, the the support part is adapted to, when the pliers are rotated towards each other and the acceleration of the rotation is below the threshold value, be pressed by the biasing device towards the support member and guided by the support member so that the second engagement member of the second end part of the arm is separated from the at least one first engagement members at the guide member, and when the pliers are rotated towards each other and the acceleration of the rotation is equal to or exceeding the threshold value, be displaced away from the support member so that the second engagement member of the second end part of the arm engages with the at least one first engagement member at the guide member.

The second end portion is displaced separated from the at least one first engagement member by the support member along the length of the guide member when the acceleration of the rotation of the pliers is below the threshold value, wherein the pliers are free to rotate towards each other. The second end portion "jumps" from being supported by the support member in its displacement along the guide member from the support member to the at least one first engagement member when the acceleration of the rotation of the pliers is equal to or exceeds the threshold value, wherein the second engagement member engages with the at least one first engagement member and the pliers becomes locked from rotation towards each other.

According to an embodiment of the invention, the support member comprises one or more a projection elements protruding away from the length of the guide member arranged at respective positions of the at least one first engagement member. The projection elements facilitates the "jump" of the second end portion of the arm from the support member to the first engagement member. Accordingly, by means of the projection elements the threshold value of the acceleration becomes lower than without the one or more projection elements.

According to an embodiment of the invention, the at least one first engagement member comprises a first tooth element comprising a first sloped surface and a second sloped surface, wherein the first sloped surface is steeper than the second sloped surface, wherein the second engagement member comprises a corresponding second tooth element that is arranged in an opposite direction to the first tooth element. Thereby, the first and second engagement members are arranged so that they engage with each other when brought in contact with each other from a first direction and not to engage with each other when brought in contact with each other from a second direction opposite to the first direction.

According to an embodiment of the invention, the the spacing arrangement further comprises a damper device comprising a further elastic element adapted to absorb and damp shock impulses when the pliers are rotated towards each other. The damper device facilitate the user to control the force applied to the food item.

According to an embodiment of the invention, the damper device comprises a stop arrangement comprising a first stop member protruding from one of the first plier and the second plier, and a second stop member at the other of the first plier and the second plier, wherein the pliers are rotatable between an operational state in which the first and second stop member are separated from each other and a non-operational state in which the first and second stop members are contacting each other.

The stop arrangement provides a mechanical stop that prevents the end parts of the two pliers to contact each other. The stop arrangement accordingly enables the two pliers to rotate towards each other from the operational state to the non-operational state.

According to an embodiment of the invention, the second end portion of the arm is in the rear position on the guide member when the first and second stop members are contacting each other.

GENERAL DESCRIPTION OF THE INVENTION

Figure 2:
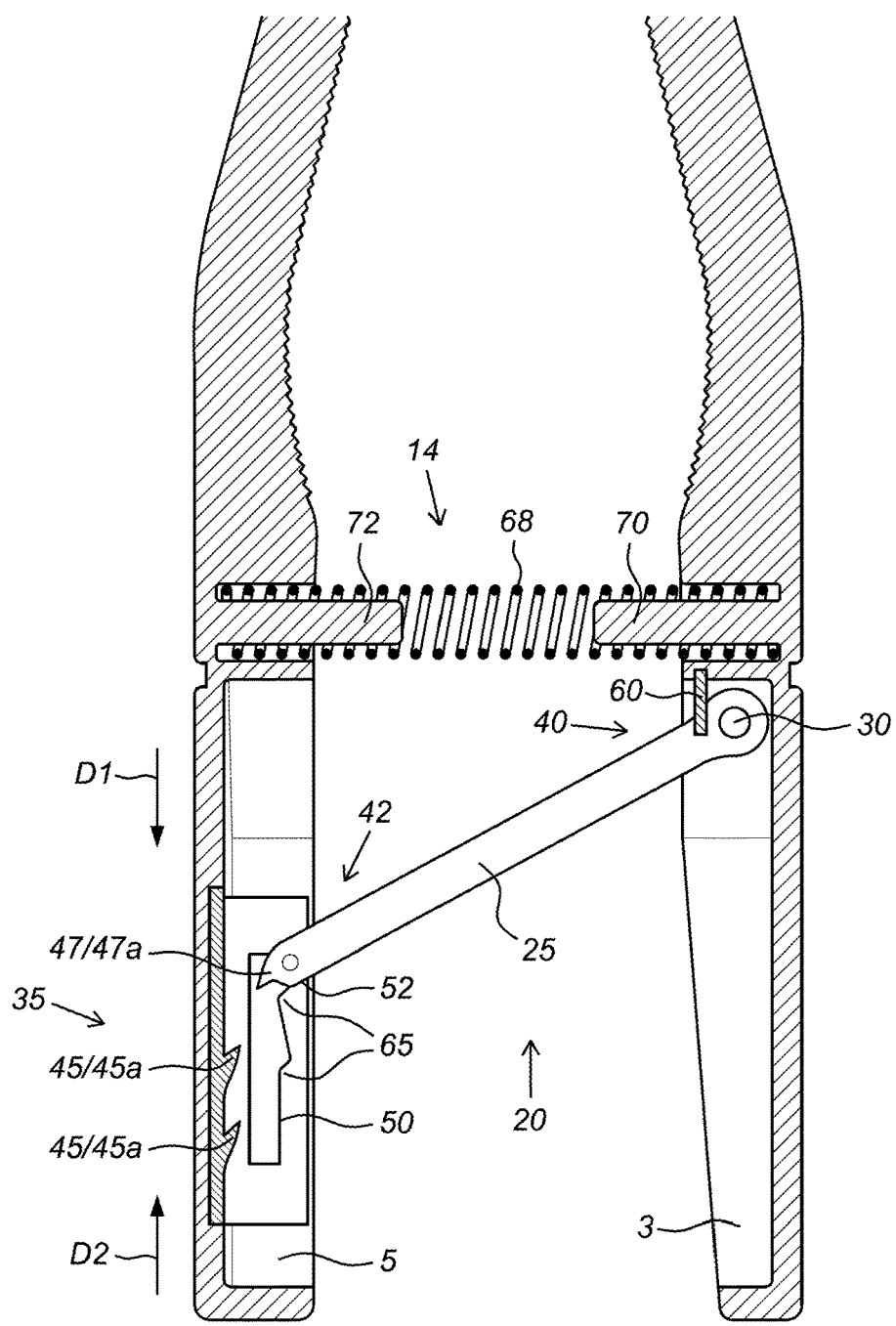
Figure 3:
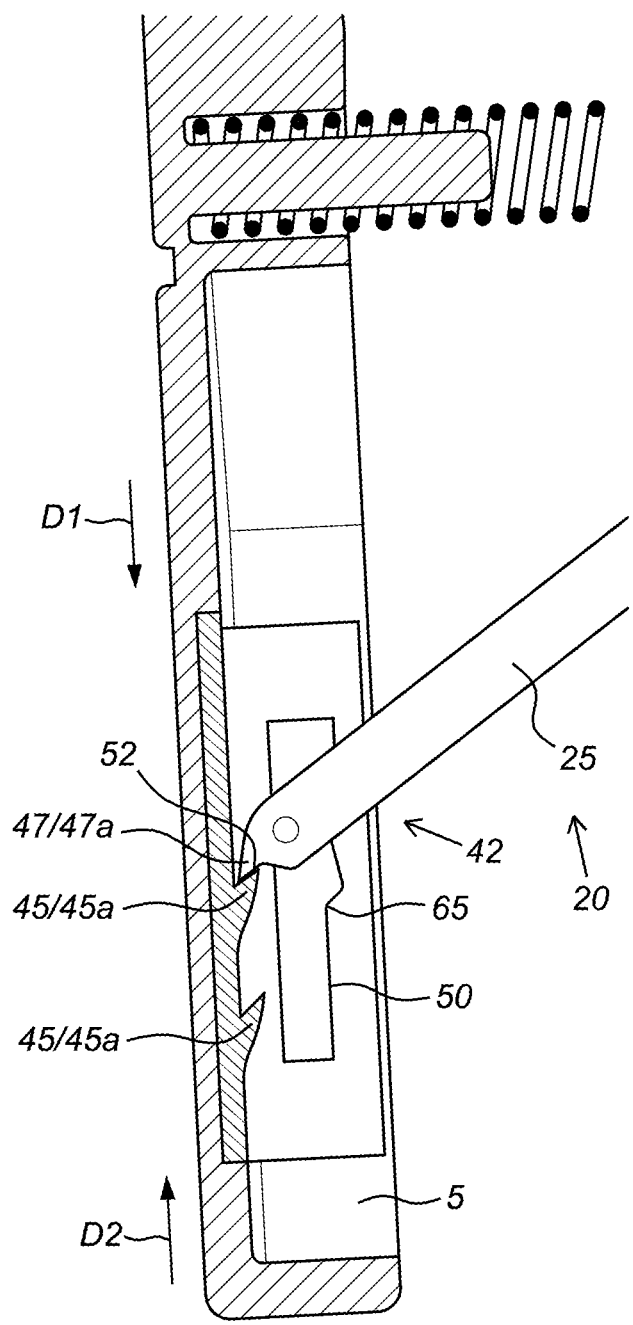
Figure 4:
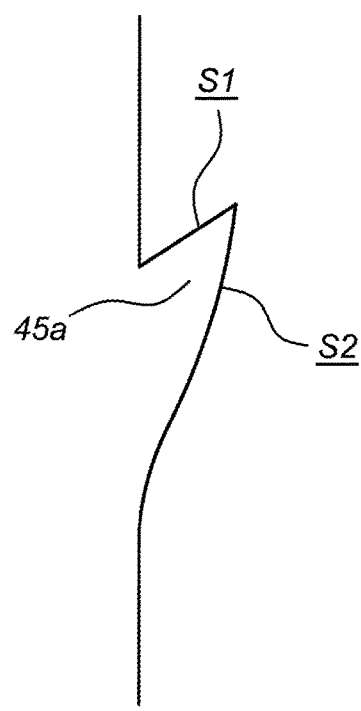
Figure 5:
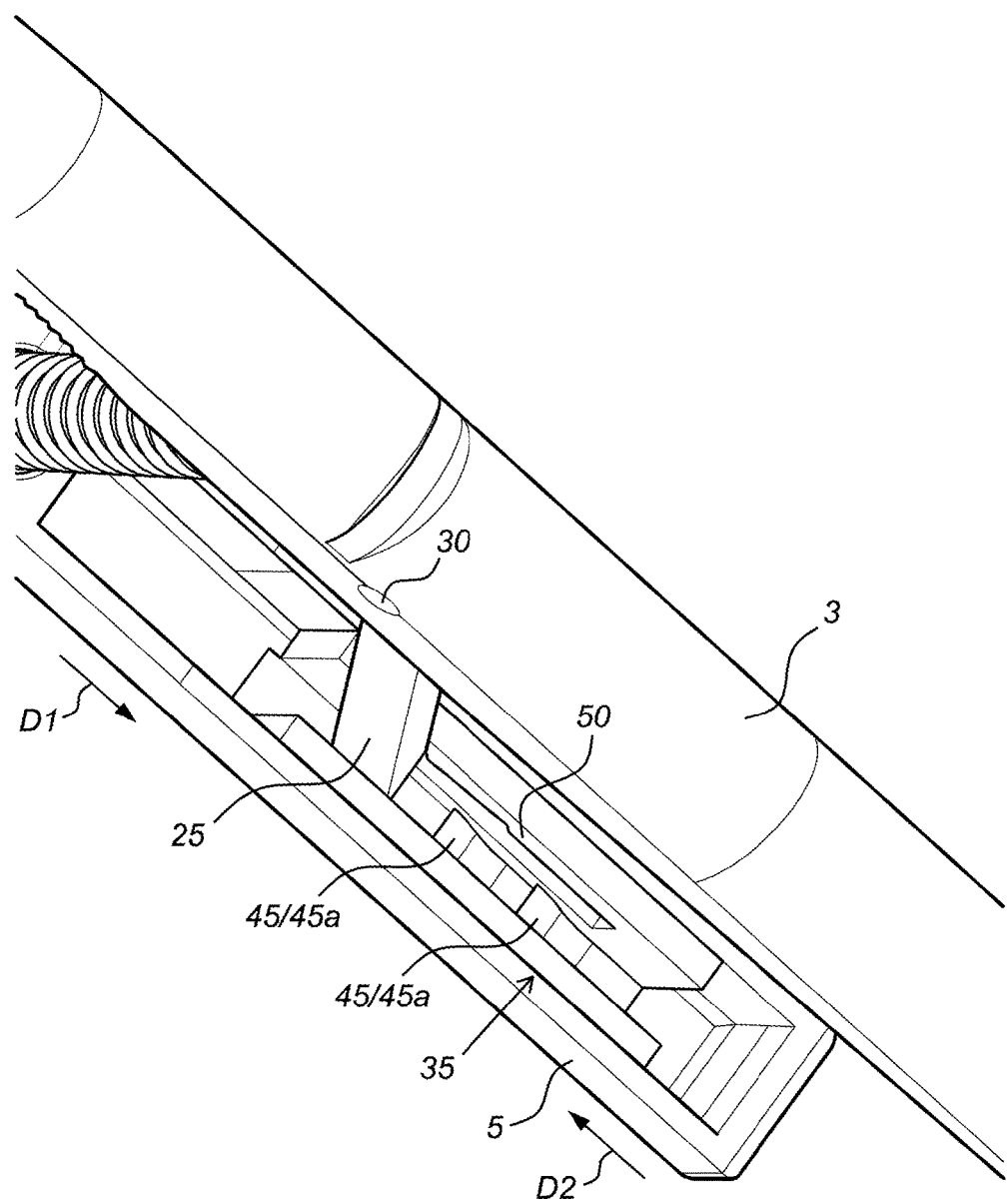

In the following is described an example of a preferred embodiment illustrated in the accompanying drawings, wherein:

FIG. 1 discloses a perspective view of a device for cracking a shell of a food item according to an embodiment of the invention;

FIG. 2 discloses a schematic side view of the device in FIG. 1, where the a locking device is in a disengaged state;

FIG. 3 discloses a schematic side view of a locking device of the device in FIG. 1, where the a locking device is in an engaged state; and FIG. 4 discloses a schematic side view of a first engagement member of the locking device of the device in FIG. 1, FIG. 5 discloses a perspective view of a guide member of the locking device of the device in FIG. 1.

In FIG. 1 a perspective view of a device 1 for cracking a shell of a food item is seen. The device 1 comprises a first plier 3, a second plier 5 and a pivot 7, such as a pivot joint, a hinge joint, and etcetera. The pivot 7 provides a rotatable connection between the first plier 3 and the second plier 5 that enables a food item to be compressed between the pliers 3, 5 by rotating the pliers 3, 5 towards each other.

The device 1 further comprises a lockable spacing arrangement 10 comprising an acceleration dependent locking device 12 and a damper device 14. The locking device 12 comprises a disengaged state in which the two pliers 3, 5 are free to rotate towards each other and an engaged state in which the two pliers 3, 5 are locked from rotating towards each other. The damper device 14 is adapted to absorb and damp shock impulses when the pliers 3, 5 are rotated towards each other.

The locking device 12 comprises an inertia device 20 for enabling the locking device 12 to be switched from the disengaged state to the engaged state. The inertia device 20 is connected to one of the two pliers 3, 5 and biased to the first position. When the two pliers 3, 5 are accelerated towards each other the inertia device 20 is subjected by a force from the one of the two pliers 3, 5.

In the case when the two pliers 3, 5 are subjected to an acceleration of the rotation below a threshold value, the acceleration is not sufficient to overcome a biasing force to displace the inertia device from the first position to the second position. Accordingly, the inertia device 20 remains in the first position and the locking device 12 is maintained in the disengaged state, thereby allowing the pliers 3, 5 to rotate towards each other.

In the case when the two pliers 3, 5 are subjected to an acceleration of the rotation equal to or exceeding the threshold value, the acceleration is sufficient to overcome the biasing force resulting in that the inertia device 20 is displaced from the first position to the second position. Accordingly, the locking device 12 is switched from the disengaged state to the engaged state, thereby the two pliers 3, 5 are locked from rotating towards each other.

The locking device 12 of the embodiment in FIG. 1 is disclosed in further details in FIG. 2-5. FIG. 2 discloses the locking device 12 in the disengaged state and FIG. 3 the locking device 12 in the engaged state.

The inertia device 20 comprises a displaceable arm 25 extending between the first plier 3 and the second plier 5. The locking device 12 device also comprises further pivot 30 and a guide member 35. FIG. 5 discloses a perspective view of an example of the guide member 35 of the locking device 12.

The further pivot 30 rotatable connects a first end portion 40 of the arm 25 to the first plier 3. The guide member 35 displaceable connects a second end portion 42 of the arm 25 to the second plier 5. Thereby, the guide member 35 enables the second end portion 42 of the arm 25 to be displace along the second plier 5 from a front position to a rear position of the guide member 35. The front position relates to a fully open state of the device 1 and the rear position relates to a fully closed position of the device 1.

The locking device 12 further comprises a first engagement member 45 and a second engagement member 47. The first engagement member 45 and the second engagement member 47 are adapted to provide engagement with each other when brought into contact. When the first engagement member 45 and a second engagement member 47 are disengaged from each other, the two pliers 3, 5 are free to rotate towards each other. When the first engagement member 45 and a second engagement member 47 are in engagement with each other, the two pliers 3, 5 are locked from rotating towards each other.

In the disclosed embodiment two first engagement member 45 are arranged along the guide member 35 and a single second engagement member 47 is arranged on the second end portion 42 of the arm 25. The second engagement member 47 is adapted to be brought into engagement with the first engagement member 45 and thereby locking the two pliers 3, 5 from rotation towards each other.

It shall be understood that a single first engagement member 45 together with the second engagement member 47 is sufficient for providing an accelerated dependent locking of the two pliers 3, 5. By means of a plurality of first engagement member 45, however, a plurality of distinctive positions for locking the rotation of the two pliers 3, 5 are provided.

The first engagement member 45 and the second engagement member 47 are adapted to provide engagement with each other when brought into contact from a first direction D1 and refrain from engagement with each other when brought into contact from a second direction D2 that is opposite to the first direction D1. In the disclosed embodiment, the first engagement member 45 and the second engagement member 47 comprise a respective first tooth element 45a and second tooth element 47a oriented in opposite directions. The respective tooth element 45a, 47a comprises a first sloped surface S1 and a second sloped surface S2, wherein the first sloped surface S1 is steeper than the second sloped surface S2. FIG. 4 discloses a schematic side view of an example of a first engagement member 45 of the locking device 12 of the device 1 in FIG. 1

The guide member 35 comprises an elongated support member 50 that extends along the length of the guide member 35. The second end portion 42 of the arm 25 comprises a support part 52. The support member 50 is adapted to guide the support part 52 along the length of the guide member 35 from the front position to the rear position as the two pliers 3, 5 are rotated towards each others.

The locking device 12 further comprises a biasing device 60 connecting the first end portion 40 of the arm 25 to the first plier 3. The biasing device 60 is adapted to act on the arm 25 with a force that pulls the second engagement member 47 at the second end portion 42 of the arm 25 away from the first engagement members 45 at the guide member 35 when the two pliers 3, 5 are rotated towards each other. In an embodiment of the invention, the biasing device 60 comprises an elastic member, such as a spring or an elastic bar.

The biasing device 60 pulls the second end portion 42 of the arm 25 towards the support member 50. Thereby, the second end portion 42 is adapted to be guided by the support member 50 when second end portion 42 of the arm 25 is displaced from the front position to the rear position on the guide member 35.

When the acceleration of the rotation of the pliers 3, 5 is below the threshold value, the acceleration is not sufficient to overcome the force from the biasing device 60 and the second end portion 42 is pressed towards the support member 50. Accordingly, the second engagement member 47 at second end portion 42 is displaced separated from the first engagement member 45 by the support member 50 along the length of the guide member 35 when the acceleration of the rotation of the pliers 3, 5 is below the threshold value. Thereby, the pliers 3, 5 are free to rotate towards each other, see FIG. 2.

On the other hand, when the acceleration of the rotation of the pliers 3, 5 is equal to or exceeding the threshold value, the acceleration of the arm 25 overcomes the force from the biasing device 60 and the second end portion 42 leaves the support member 50 and moves to one of the first engagement members 45 that are arranged in opposite direction to the support member 50. Thereby, the second engagement member 47 engages with one of the first engagement members 45 and the pliers 3, 5 becomes locked from rotation towards each other, see FIG. 3.

The support member 50 further comprises a projection element 65 protruding away from the length of the support member 50. In the disclosed embodiment the support member 50 comprises two projection elements 65. The projection elements 65 facilitate the second engagement member 47 at the second end portion 42 of the arm 25 to move away from the support member 50 to one of the first engagement members 45. Accordingly, by means of the projection elements 65, the acceleration necessary for the second end portion 42 to move away from the support member 50 becomes lower compared without the projection elements 65.

The spacing arrangement 10 further comprising the damper device 14. The damper device 14 comprises a further elastic member 68, such as a spring, that is adapted to absorb and damp shock impulses when the pliers 3, 5 are rotated towards each other.

The damper device 14 further comprises a stop arrangement comprising a first stop member 70 protruding from the first plier 3 and a second stop member 72 protruding from the second plier 5. The stop arrangement enables the pliers 3, 5 to be rotated between an operational state in which the first stop member 70 and second stop member 72 are separated from each other and a non-operational state in which the first stop member 70 and second stop member 72 are contacting each other. The stop arrangement provides a mechanical stop the prevent end parts of the two pliers 3, 5 from contacting each other.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A device for cracking a shell of a food item, the device comprising:
   a first plier, a second plier and a pivot rotatably connecting the first plier with the second plier for enabling the food item, when arranged between the pliers, to be compressed between the pliers by rotation of the pliers towards each other;
   a lockable spacing arrangement comprising an acceleration dependent locking device adapted to permit the rotation of the two pliers towards each other if an acceleration of the rotation is below a threshold value and adapted to lock the rotation of the two pliers towards each other if the acceleration of the rotation is equal to or exceeding said threshold value.

2. The device for cracking according to claim 1, wherein the locking device comprises a disengaged state in which the two pliers are free to rotate towards each other and an engaged state in which the two pliers are prevented from rotating towards each other, the locking device comprising an inertia device biased to a first position relating to the disengaged state and adapted to be displaced from the first position to a second position relating to the engaged state if the acceleration of the rotation of the two pliers towards each other is equal to or exceeding said threshold value.

3. The device for cracking according to claim 2, wherein the locking device further comprises a first engagement member, a second engagement member arranged at the inertia device and adapted to engage with the first engagement member, thereby locking the rotation of the two pliers towards each other, and a biasing device applying a force on the inertia device, wherein the biasing device is arranged to hold the second engagement member of the inertia device disengaged from the first engagement member if the acceleration of the rotation of the pliers is below said threshold value and arranged to allow the second engagement member of the inertia device to engaged with the first engagement member if the acceleration of the rotation of the pliers is equal to or exceeding said threshold value.

4. The device for cracking according to claim 3, wherein the inertia device comprises a displaceable arm extending between the first plier and the second plier, and where the locking device further comprises a further pivot connecting a first end portion of the arm to the first plier, and an elongated guide member extending along the length of the second plier and connecting a second end portion of the arm displaceable along the length of the second plier, wherein the guide member further comprises the first engagement member and the second end portion of the arm comprises the second engagement member.

5. The device for cracking according to claim 4, wherein the guide member comprises two or more first engagement members distributed along the length of the guide member.

6. The device for cracking according to claim 4, wherein the further pivot at the first plier is arranged closer to the pivot than the guide member at the second plier.

7. The device for cracking according to claim 4, wherein the guide member provides displacement of the second end portion of the arm between a front position and a rear position when the pliers are rotated towards each other, which front position is closer to the pivot than the rear position.

8. The device for cracking according to claim 4, wherein the biasing device comprises an elastic member connected between the first plier and the arm and adapted to act on the arm with a force that pulls the second engagement member at the second end portion of the arm away from the first engagement member of the guide member while the second end portion of the arm is displaced along the guide member.

9. The device for cracking according to claim 4, wherein the guide member comprises an elongated support member extending along the length of the guide member and the second end portion of the arm comprises a support part adapted to be guided by the support member along the length of the guide member.

10. The device for cracking according to claim 9, wherein the support part is adapted to, when the pliers are rotated towards each other and the acceleration of the rotation is below the threshold value, be pressed by the biasing device towards the support member and guided by the support member so that the second engagement member of the second end portion of the arm is separated from the first engagement member at the guide member, and when the pliers are rotated towards each other and the acceleration of the rotation is equal to or exceeding the threshold value, be displaced away from the support member so that the second engagement member of the second end portion of the arm engages with the first engagement member at the guide member.

11. The device for cracking according to claim 9, wherein the support member comprises one or more projection elements protruding away from the length of the guide member arranged at respective position of the first engagement member.

12. The device for cracking according to claim 3, wherein the first engagement member comprises a first tooth element comprising a first sloped surface and a second sloped surface, wherein the first sloped surface is steeper than the second sloped surface, wherein the second engagement member comprises a corresponding second tooth element that is arranged in an opposite direction to the first tooth element.

13. The device for cracking according to claim 1, wherein the spacing arrangement further comprises a damper device comprising an elastic element adapted to absorb and damp shock impulses when the pliers are rotated towards each other.

14. The device for cracking according to claim 13, wherein the damper device comprises a stop arrangement comprising a first stop member protruding from one of the first plier and the second plier, and a second stop member at the other of the first plier and the second plier, wherein the pliers are rotatable between an operational state in which the first stop member and the second stop member are separated from each other and a non-operational state in which the first stop member and the second stop member are contacting each other.

15. The device for cracking according to claim 14, further comprising an inertia device, wherein the inertia device comprises a displaceable arm extending between the first plier and the second plier, and where the locking device further comprises a further pivot connecting a first end portion of the arm to the first plier, and an elongated guide member extending along the length of the second plier and connecting a second end portion of the arm displaceable along the length of the second plier, wherein the guide member further comprises a first engagement member and the second end portion of the arm comprises a second engagement member wherein the second end portion of the arm is in a rear position on the guide member when the first stop member and the second stop member are contacting each other.

* * * * *